May 5, 1970   J. W. HENNEMAN   3,509,895
OXYGEN REGULATOR
Filed July 20, 1967   2 Sheets-Sheet 1
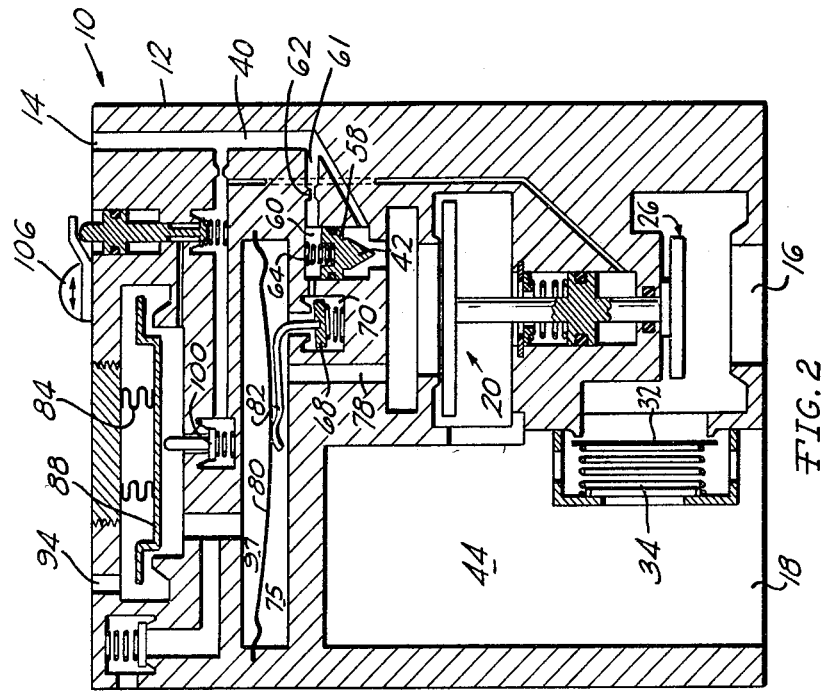
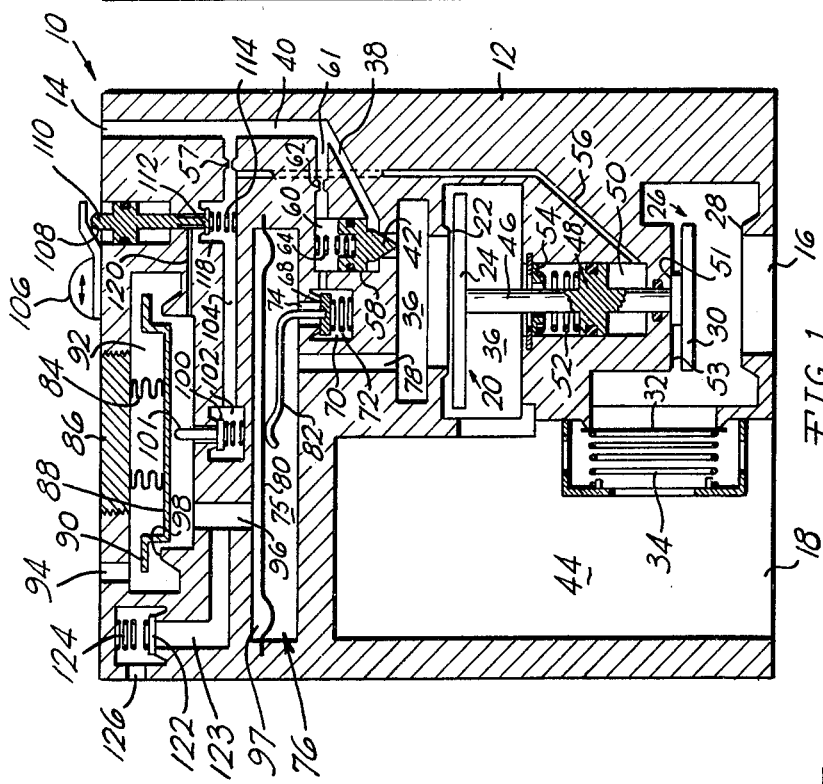
INVENTOR
JOHN W. HENNEMAN
BY
ATTORNEY

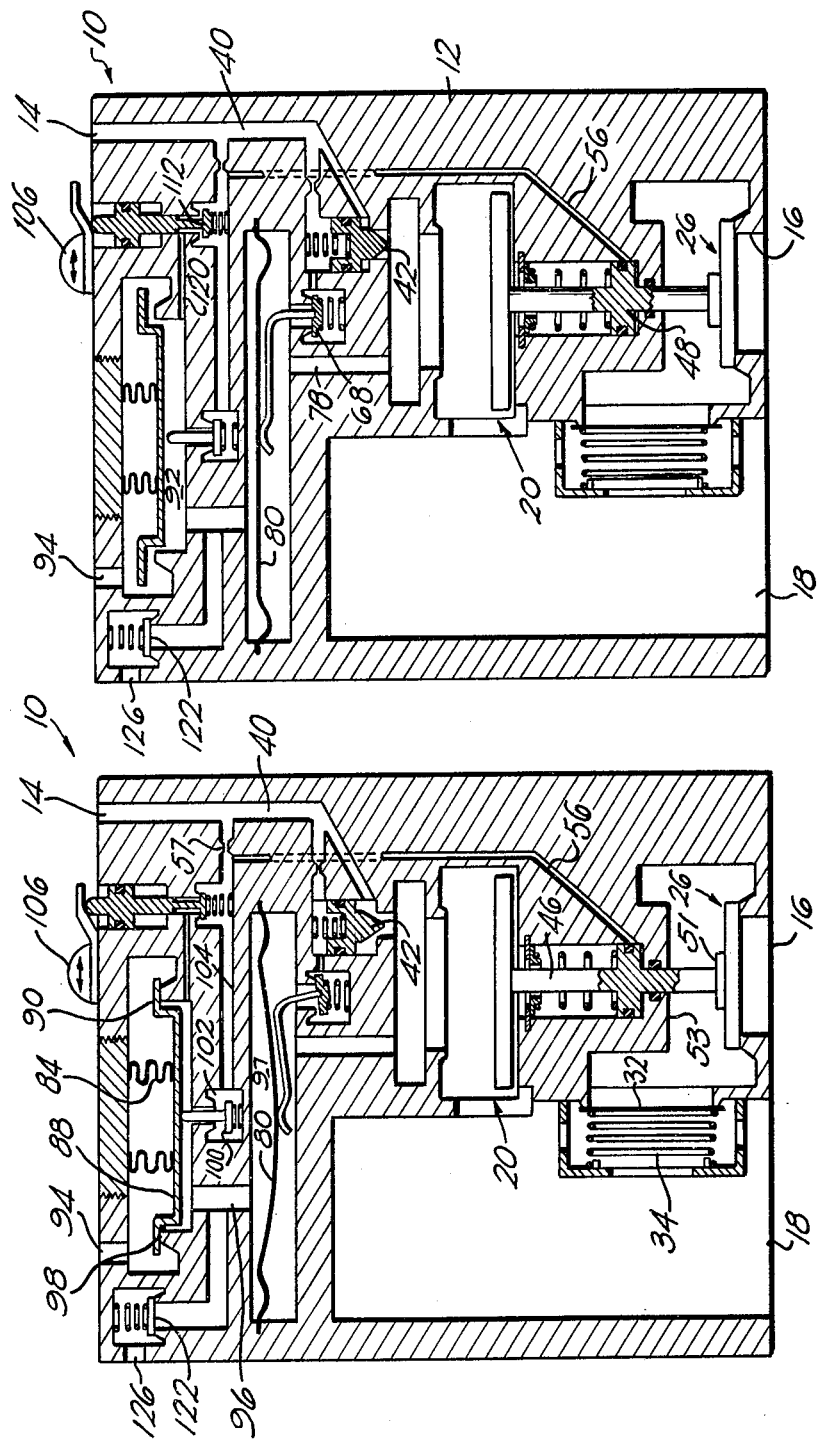

United States Patent Office 3,509,895
Patented May 5, 1970

---

3,509,895
OXYGEN REGULATOR
John W. Henneman, Rock Island, Ill., assignor to The
Bendix Corporation, a corporation of Delaware
Filed July 20, 1967, Ser. No. 654,760
Int. Cl. A62b 9/00
U.S. Cl. 137—81                                    11 Claims

ABSTRACT OF THE DISCLOSURE

Apparatus for controlling the flow of breathing oxygen and ambient air at changing altitudes having a proportioning member connecting an oxygen regulator valve and an ambient air regulator valve to provide fixed proportioning of ambient air and oxygen below a predetermined altitude. Above that altitude, the ambient air regulator valve is automatically closed to supply one hundred percent oxygen to the breathing apparatus at a given pressure schedule.

BACKGROUND OF THE INVENTION

Field of the invention

An improvement in apparatus to mix air and oxygen for breathing apparatus up to a predetermined altitude and to supply one hundred percent oxygen at a given pressure schedule above that altitude.

SUMMARY OF THE INVENTION

The present invention provides a novel dilution regulator wherein only one aneroid is used to control whether: (1) an air and oxygen mixture of predetermined proportion is delivered to the user on suction demand; (2) 100% oxygen is delivered to the user on suction demand or (3) 100% oxygen is delivered to the user in the pressure breathing mode. More particularly, an oxygen regulator valve, incorporating a dilution mechanism consisting of an air proportioning valve and an oxygen proportioning valve which are rigidly connected together and positioned, by means of the oxygen pressure (related to the inlet oxygen pressure) acting through a dynamic seal, in the full open position of the air proportioning valve, to produce a predetermined mixture of air and oxygen on the suction demand of the user at ground level. In the case of no oxygen inlet pressure the dilution mechanism is held in the air proportioning valve closed position by a spring means. When the altitude is increased to a predetermined value between 11,000 and 20,000 feet above sea level, the aneroid opens an exhaust valve which relieves the oxygen pressure on the dynamic seal thereby causing the dilution mechanism to move in the direction which will close the air valve, closing it completely and fully opening the oxygen valve thus providing 100% oxygen to the user on suction demand. With further increasing altitude to the range of 30,000 to 35,000 feet above sea level the aneroid causes the 100% oxygen to be delivered to the user under gradually increasing pressure up to a predetermined maximum value such as 20 inches of water and the user is protected from over pressure by the opening of a pressure relief valve set at this pressure. The oxygen regulator valve described above provides protection against the user taking off without his oxygen supply turned on or with an insufficient oxygen supply since without adequate oxygen inlet pressure the air intake valve is closed and there is insufficient atmosphere for him to breathe either air or oxygen.

The user's physiological requirements are met for ambient pressures ranging from that at sea level to that at a preselected altitude in the range of 11,000 to 20,000 feet above sea level. Furthermore, the physiological requirements can be met for ambient pressures corresponding to the altitude range from 11,000 feet to approximately 50,000 feet above sea level with the use of only a single aneroid. The same aneroid is used to establish a pressure schedule increasing with altitude under which the oxygen is supplied to the breathing apparatus under positive pressures for a preselected range of altitudes starting at 30,000 to 35,000 feet and extending to approximately 50,000 feet above sea level. The increase of this pressure is limited by the opening of a relief valve at a preselected maximum pressure.

BRIEF DESCRIPTION OF THE DRAWINGS

FIG. 1 is a schematic illustration of the oxygen regulator of this invention showing the regulator components in positions providing for a fixed proportioning of oxygen and air, with no demand at the regulator outlet;

FIG. 2 is a schematic illustration like FIG. 1 showing the regulator components in their positions providing for a fixed proportioning of oxygen and air with a demand at the regulator outlet;

FIG. 3 is a schematic illustration like FIG. 1 showing the regulator components in the positions which they automatically assume at very low ambient pressures, providing for one hundred percent oxygen under pressure to the regulator outlet; and FIG. 4 is a schematic illustration like FIG. 1 showing a manual control member in a position providing for one hundred percent oxygen to the regulator outlet.

DESCRIPTION OF THE PREFERRED EMBODIMENTS

With reference to the drawing, the oxygen regulator of this invention, indicated generally at 10, is illustrated in FIG. 1 as consisting of a body 12 having an inlet port 14 normally connected to a supply of oxygen at a predetermined pressure, an air inlet opening 16, and an outlet opening 18 which is usually connected to the breathing mask of an aircraft pilot or crew member. An oxygen regulator valve 20, consisting of a valve seat 22 and a valve member 24 movable toward and away from the seat, is disposed between the inlet port 14 and the outlet 18. An air regulator valve 26, consisting of a valve seat 28 surrounding the opening 16 and a valve member 30 movable toward and away from the seat 28, is disposed between the air inlet 16 and the outlet 18. An air check valve 32, normally maintained in a closed position by a light spring 34, is arranged between the air inlet opening 16 and the outlet opening 18 so that suction at the outlet 18 will open the valve 32.

The oxygen regulator valve 20 is positioned in a chamber 36 which communicates, on one side of the valve seat 22, with a branch passage 38 which in turn communicates through a main passage 40 with the inlet port 14. In the position of the regulator 10 shown in FIG. 1, communication between the passage 38 and the chamber 36 is closed by a main valve member 42. The chamber 36 communicates on the opposite side of the valve seat 22 with an outlet cavity 44 which terminates in the outlet opening 18.

The oxygen regulator valve member 24 and the air regulator valve member 30 are connected by a rod 46 which is hereinafter sometimes referred to as a proportioning member for reasons which will later become apparent. A dynamic seal 48, which in the illustrated embodiment of the invention is a piston, is mounted on the rod 46 and disposed in a cylinder chamber 50. It will be readily understood by those skilled in the art that another type of dynamic seal, such as a diaphragm, can be substituted for the piston which is shown. A spring 52 extends between one side of the piston 48 and a fixed abutment 54 so as to urge the piston 48 in a direction tending to open the oxygen valve 20. A branch passage 56 in the body 12 communicates with the main oxygen passage 40 through restriction 57 and with the cylinder 50 on the opposite side of the piston 48 so that oxygen pressure from the passage 56 opposes the pressure of spring 52. Accordingly, when oxygen at or above a certain pressure is supplied to the cylinder 50 the piston 48 is moved to the position shown in FIGS. 1 and 2 in which the valve member 30 is in a stop position in which a surface 51 thereon engages a stop surface 53 in the body 12. By virtue of the connection of valve members 24 and 30, this stop position of valve member 30 defines a position of valve member 24. As a result, when a predetermined oxygen supply pressure or greater is maintained at inlet port 14, the valve members 24 and 30 are maintained in fixed positions relative to their seats 22 and 28, respectively, so that when a demand is made at the outlet 18, a fixed proportion of oxygen and air is supplied to the opening 18 through the valves 20 and 26.

The main oxygen valve member 42 is mounted on a piston 58 slidably mounted in a cylinder chamber 60 disposed on the opposite side of the valve member 42 from the cavity 36. The chamber 60 communicates on one side of the piston 58 with the oxygen passage 38 and on the opposite side of the piston 58, the chamber 60 communicates with the main oxygen supply passage 40 through a branch passage 61 which is provided with a restriction 62. A spring 64 urges the valve member 42 toward a closed position, shown in FIG. 1, so that when the pressures on opposite sides of the piston 58 are equal, the valve 42 is closed.

A pilot valve member 68 is positioned in a chamber 70 which communicates with the piston chamber 60 on the spring side of the piston 58. A spring 72 urges the pilot valve member 68 toward a closed position with respect to an outlet opening 74 that communicates with a lower portion 75 of a diaphragm chamber 76. The lower portion 75 of the chamber 76 communicates with the oxygen regulator valve 20 through a passage 78 and in turn with the regulator outlet opening 18. The pilot valve outlet opening 74 is in communication with the regulator outlet opening 18 through oxygen regulator valve 20.

A diaphragm 80 in the chamber 76 engages an actuating lever 82 attached to the pilot valve member 68 so that when the diaphragm 80 is moved downwardly in response to a differential pressure in the chamber 76, the pilot valve member 68 will be tipped open, as shown in FIG. 2.

The oxygen regulator 10 is also provided with an aneroid 84 having one end attached to a plug 86 mounted in the housing 12 and having its other end attached to a movable valve plate 88 having an outwardly turned flange 90. Both the aneroid 84 and the plate 88 are disposed in an aneroid chamber 92 having an outlet opening 94 to ambient pressure and a passageway 96 leading to an upper portion 97 of the diaphragm chamber 76. The aneroid chamber 92 is also provided with a flange seat 98 positioned so that a downward movement of the plate 88 will restrict flow between the flange 90 and the flange seat 98. The plate 88 and the seat 98 thus cooperate to form a bleed valve.

An exhaust valve 100, having an exhaust valve stem 101, is disposed in a chamber 102 which communicates in turn with the inlet port 14 through an exhaust passageway 104, the restriction 57 and the supply passage 40. The exhaust valve chamber 102 also communicates with the dynamic seal 48 through the exhaust passage 104 which communicates with the branch passage 56 leading to the cylinder 50. As can be seen from a comparison of FIGS. 1 and 3, an expansion of the aneroid 84 will cause the valve plate 88 to move downwardly to contact the exhaust valve stem 101 and move the exhaust valve 100 to an open position, thus creating a passage to ambient pressure from the dynamic seal 48 through the passage 56, the exhaust passage 104, the exhaust valve 100, and to the outlet opening 94 thereby relieving the oxygen pressure on dynamic seal 48 to allow the spring member 52 to move the proportioning member 46 downwardly, which movement closes the ambient air regulator valve 26 and fully opens the oxygen regulator valve 20.

A manual control member 106 is provided to enable the user to manually close the air regulator valve 26 and fully open the oxygen regulator valve 20. The member 106 is slidably mounted on the housing 12 to have a cam surface 108 to contact and depress manual control valve stem 110. A manual control valve 112, normally held in the closed position by a spring 114, is connected to the stem 110 so as to open when the stem 110 is depressed as described below. The manual valve 112 is disposed in a chamber 118 which communicates with the dynamic seal 48 through the branch passage 56 and the exhaust passage 104. The other side of the manual control valve 112 is connected to the aneroid chamber 92 by a passage 120. As shown in FIG. 4, when the manual valve 112 is opened, the oxygen pressure on the dynamic seal 48 is relieved through the branch passage 56, the passage 104, the valve 112, the passage 120, the aneroid chamber 92, and the aneroid chamber outlet opening 94, thereby allowing the spring member 52 to move the proportioning member 46 downwardly to close the ambient air regulator valve 26 and fully open the oxygen regulator valve 20.

Oxygen regulator 10 is also provided with a pressure relief valve 122 which communicates at its one end with the upper portion 97 of the diaphragm cavity 76 through passages 123 and 96 and at its other end with ambient pressure through a pressure relief outlet opening 126 in the housing 12. The valve member 122 is normally held in a closed position by a calibrated spring member 124.

OPERATION

Assume that the ambient air pressure conditions are such that the regulator components are in the positions shown in FIG. 1. When a demand is made at the regulator outlet 18, the corresponding suction in the outlet cavity 44 is transmitted through the oxygen regulator valve 20, the chamber 36, and passage 78, to the lower portion 75 of the diaphragm chamber 76. Since at this time the upper portion 97 of the diaphragm chamber 76 is exposed to ambient pressure, through the passage 96, the aneroid chamber 92 and the aneroid chamber outlet opening 94, the suction at outlet 18 creates a pressure differential across the diaphragm 80 which causes it to bow downwardly, as shown in FIG. 2. The downwardly bowing action of the diaphragm 80 acts on the lever 82 to tip open the pilot valve 68 thereby allowing a flow of oxygen from the inlet opening 14, through the supply passage 40, the passage 61, valve chambers 60 and 70, the passage 78, the oxygen regulator valve 20, and the outlet cavity 44 to regulator outlet opening 18. The flow through restriction 62 creates a pressure differential across the piston 58 which overcomes the force of the spring 64 thereby opening the valve member 42 to admit a primary flow of oxygen from the oxygen inlet opening 14 through the supply passage 40, the passage 38, the oxygen regulator valve 20 and the outlet cavity 44 to the regulator outlet 18. Thus it can be seen that a demand at the regulator outlet 18 causes a flow of oxygen to the regulator outlet 18.

Suction at the outlet 18 also acts on the air check valve 32 and overcomes the force applied by the spring 34 to allow air to flow from the ambient air inlet 16 to the regulator outlet 18 to dilute the flow of oxygen. It can thus be seen that at low altitudes a predetermined oxygen-air mixture is at all times supplied to outlet 18. During normal flight conditions where the cabin is pressurized to 8000 feet equivalent, the proportioning member 46 maintains the oxygen and air regulator valves 20 and 26 in a fixed relation calibrated to provide maximum air dilution by limiting the amount of oxygen flow through valve 20 to the minimum physiological requirements, thereby conserving oxygen. Uniform air-oxygen dilution is also achieved at all flows by virtue of the use of the rigid proportioning member 46.

The spring 52 is calibrated so that the air valve 26 is closed automatically when the oxygen pressure at port 14 falls below a predetermined pressure such as 20 p.s.i.g. This warns the pilot that his oxygen supply is nearly depleted and prevents the inadvertent breathing of only air at elevated altitudes.

When the ambient air pressure ranges from sea level to a preselected altitude such as 11,000 feet, the proportioning member 46 is positioned as shown in FIGS. 1 and 2 to provide fixed proportioning of oxygen and ambient air flows to the outlet 18 of the regulator. As the altitude increases, the corresponding decrease in ambient air pressure causes the aneroid 84 to expand and move the plate 88 downwardly. At the preselected altitude referred to, the plate 88 depresses the exhaust valve stem 101 thereby opening the valve member 100 and presenting a path flow to ambient pressure from the dynamic seal 48 through the passage 56, the exhaust passage 104, the exhaust valve chamber 102, the aneroid chamber 92, and the aneroid chamber outlet opening 94. In this manner, the oxygen pressure on the dynamic seal 48 is relieved allowing the spring 52 to act upon and move the dynamic seal 48 and the attached proportioning member 46 downwardly to close the air regulator valve 26 and fully open the oxygen regulator valve 20 as shown in FIGS. 3 and 4. When the proportioning member 46 is in the downward position shown, the oxygen regulator provides one hundred percent oxygen to the regulator outlet 18 upon demand by the user. In response to a suction at the regulator outlet 18 the diaphragm 80 operates in the manner described above to open main valve 42 and provide a flow of oxygen through the regulator valve 20 to the regulator outlet 18. Thus, on demand, pure oxygen is supplied by regulator 10 at certain altitudes.

When a still higher preselected altitude is reached, such as 35,000 feet, the continued expansion of the aneroid 84 creates a force of increased magnitude sufficient to move the flange 90 on the plate 88 practically against the flange seat 98 (FIG. 3). This causes a pressure buildup in the portion of the aneroid chamber 92 below the plate, principally due to the flow of oxygen from the oxygen inlet opening 14 through the main supply passage 40, the restriction 57, the exhaust passage 104, the exhaust valve chamber 102, the exhaust valve 100, and into the aneroid chamber 92. This increase in pressure in the aneroid chamber 92 is transmitted to the upper portion 97 of the diaphragm cavity 76 through the passage 96 thereby causing an increased pressure differential across the diaphragm 80 and a corresponding bowing movement of the diaphragm 80, as illustrated in FIG. 3. Movement of diaphragm 80 causes main valve 42 to open and supply one hundred percent oxygen under pressure to the outlet 18 to meet physiological requirements.

The magnitude of the force exerted on plate 88 by aneroid 84 increases as the altitude increases, thus increasing the pressure which is maintained on the diaphragm 80. Whenever the oxygen pressure force on the plate 88 exceeds the force of the aneroid thereon, the plate 88 is moved off seat 98 to meter oxygen and maintain the pressure in cavity portion 97. Thus, as altitude is increased the pressure on diaphragm 80 is increased to cause the regulator outlet pressure to build up in accordance with established pressure breathing requirements. As a safety measure, a pressure relief valve 122 is positioned in body 12 in communication with passage 96 and an exhaust opening 126. The valve 122 is set to open and relieve the pressure in the upper portion 97 of diaphragm chamber 76 when a preselected pressure is reached.

From the above description it is seen that this invention provides a regulator 10 in which a single aneroid 84 can be employed because the proportioning member 46 connecting the regulating valves 20 and 26, as described herein, eliminates the need of a separate aneroid for the air valve. A decrease in the number of aneroids provides for an increase in reliability of the regulator.

What is claimed is:

1. In an oxygen regulator unit which includes a body having an inlet port for oxygen under pressure, an inlet opening for ambient air and an outlet opening adapted to be connected to breathing apparatus,
   oxygen regulator valve means in said body between said inlet port and said outlet opening and operable to regulate the rate of flow of oxygen therebetween,
   air regulator valve means in said body between said air inlet opening and said outlet opening,
   a proportioning member connected to and extending between said valve means so that an increase in the restriction of one valve means proportionally decreases the restriction of the other valve means,
   means operatively associated with said proportioning member to regulate said restrictions of said valve means as a predetermined function of oxygen inlet pressure, whereby flow of oxygen and ambient air to said outlet opening is in predetermined proportions dependent on said oxygen inlet pressure, and
   means operable at a predetermined ambient pressure providing for movement of said proportioning member to a position in which said air regulator valve means is closed and the restriction at said oxygen regulator valve means is decreased so that flow at said outlet opening will be undiluted oxygen.

2. In an oxygen regulator unit having the structure set forth in claim 1 wherein said means operatively associated with said proportioning member for regulating the restrictions of said valve means comprises,
   spring means urging said proportioning member in one direction,
   dynamic seal means operable in the presence of a pressure thereon to urge said proportioning member in the opposite direction, and
   a passage in said body connecting said dynamic seal means with said inlet port so that the oxygen pressure will move said proportioning member to a position in which said oxygen regulator valve means limits the flow of oxygen therethrough to a predetermined portion of total flow through said outlet opening.

3. In an oxygen regulator unit having the structure set forth in claim 2 wherein said means operable at a predetermined ambient pressure includes
   pressure responsive means operable at a predetermined low ambient pressure to communicate said passage with the ambient atmosphere so as to relieve oxygen pressure on said dynamic seal means so that said spring means will move said proportioning member to a position in which said air regulator valve means is closed and the restriction at said oxygen regulator valve means is decreased so that suction at said outlet opening will cause a flow of undiluted oxygen to said outlet opening.

4. In an oxygen regulator unit having the structure set forth in claim 3 wherein said means operable at a predetermined low ambient pressure is an aneroid.

5. In an oxygen regulator having the structure set forth in claim 3 further including
   means forming a chamber in said body,
   diaphragm means in said chamber,
   first passage means communicating said oxygen regulator valve means with said chamber on one side of said diaphragm,
   a main oxygen valve disposed between said oxygen regulator valve means and said inlet port through which the principal supply of oxygen for said oxygen regulator valve means must flow, and
   means responsive to a differential pressure in said chamber on opposite sides of said diaphragm means causing movement of said diaphragm in one direction for opening said main oxygen valve to provide for a flow of oxygen from said inlet port to said oxygen regulator valve means, said means operable at a predetermined ambient pressure further including second passage means communicating said chamber on the opposite side of said diaphragm with said oxygen inlet port, bleed valve means operable in an open position to communicate said second passage means with the ambient atmosphere, said bleed valve means being operatively associated with said pressure responsive means so that at ambient pressure below said predetermined low ambient pressure said pressure responsive means will restrict said bleed valve means so that oxygen from said inlet port will create said pressure differential in said chamber.

6. In an oxygen regulator having the structure set forth in claim 5 wherein said bleed valve means is responsive to the relationship between ambient pressure and oxygen pressure in said second passage means so that said bleed valve means will meter when the ambient pressure is below said predetermined low ambient pressure so as to maintain predetermined pressure conditions in said chamber related to the ambient pressure.

7. In an oxygen regulator unit having the structure set forth in claim 2 further including, manually operable means operable to communicate said passage with the ambient atmosphere so as to relieve oxygen pressure on said dynamic seal means so that said spring means will move said proportioning member to a position in which said air regulator valve means is closed and the restriction at said oxygen regulator valve means is decreased so that undiluted oxygen can flow to said outlet opening.

8. In an oxygen regulator unit which includes a body having an inlet port for oxygen under pressure, an inlet opening for ambient air and an outlet opening adapted to be connected to breathing apparatus, oxygen regulator valve means in said body between said inlet port and said outlet opening and operable to regulate the rate of flow of oxygen therebetween, air regulator valve means in said body between said air inlet opening and said outlet opening, a proportioning member connected to and extending between said valve means so that an increase in the restriction of one valve means proportionally decreases the restriction of the other valve means, means operatively associated with said proportioning member to regulate said restrictions of said valve means as a predetermined function of oxygen inlet pressure, whereby flow of oxygen and ambient air to said outlet opening is in predetermined proportions dependent on said oxygen inlet pressure, and means responsive to the magnitude of suction at said outlet opening for controlling the flow of oxygen from said inlet port to said oxygen regulator valve means.

9. In an oxygen regulator unit having the structure set forth in claim 8 wherein said means responsive to the magnitude of said suction at said outlet comprises, diaphragm means responsive to the magnitude of suction at said outlet, and a main valve operably associated with said diaphragm means to control the flow of oxygen from said oxygen inlet port to said oxygen regulator valve means.

10. In an oxygen regulator unit having the structure set forth in claim 9 further including, a pilot valve operably connected to said diaphragm having an inlet communicating with said oxygen inlet port and an outlet communicating with said regulator outlet opening, and means operably associated with said pilot valve to regulate said main valve restriction as a function of flow of oxygen through said pilot valve.

11. In an oxygen regulator unit having the structure set forth in claim 8 further including, supplementary means for increasing the flow of oxygen to said oxygen regulator valve means for a predetermined range of low ambient pressure.

References Cited

UNITED STATES PATENTS

| | | | |
|---|---|---|---|
| 962,111 | 6/1910 | Assmann | 137—99 XR |
| 2,436,522 | 2/1948 | Meidenbauer | 137—81 |
| 2,763,279 | 9/1956 | Godden et al. | 137—99 |
| 2,883,996 | 4/1959 | Blewett et al. | 137—98 XR |
| 2,988,085 | 6/1961 | Jones. | |
| 3,068,879 | 12/1962 | Snowman et al. | 137—81 |

WILLIAM F. O'DEA, Primary Examiner

R. GERARD, Assistant Examiner

U.S. Cl. X.R.

137—99, 114